_United States Patent_ [19]

Noomen et al.

[11] 4,173,682

[45] Nov. 6, 1979

[54] PROCESS FOR COATING A SUBSTRATE WITH A RADIATION AND MOISTURE CURABLE COATING COMPOSITION

[75] Inventors: Arie Noomen, Voorhout; Johannes M. P. van der Geest; Cornelis de Jong, both of Sassenheim; Dick Van Santen, Leimuiden, all of Netherlands

[73] Assignee: Akzo N.V., Arnhem, Netherlands

[21] Appl. No.: 884,588

[22] Filed: Mar. 8, 1978

[30] Foreign Application Priority Data

Mar. 9, 1977 [NL] Netherlands ................. 7702518

[51] Int. Cl.$^2$ ................................ B05D 3/06
[52] U.S. Cl. ................ 428/423; 204/159.15; 204/159.19; 260/18 TN; 427/54.1; 427/44; 428/500; 528/73; 560/26; 560/158
[58] Field of Search .............. 427/44, 54; 560/26, 560/158; 260/18 TN; 528/68, 73; 96/35.1; 204/159.15

[56] References Cited

U.S. PATENT DOCUMENTS

| | | | |
|---|---|---|---|
| 3,935,330 | 1/1976 | Smith et al. ........................ | 427/54 |
| 4,013,806 | 3/1977 | Volkert et al. ..................... | 427/54 |
| 4,025,407 | 5/1977 | Chang et al. ...................... | 427/54 |

_Primary Examiner_—John H. Newsome
_Attorney, Agent, or Firm_—Stevens, Davis, Miller & Mosher

[57] ABSTRACT

A process is disclosed for coating a substrate with a radiation curble coating composition, characterized in that the composition comprises (A) an at least one isocyanate group-containing adduct of (a) an acrylic or methacrylic hydroxy ester with 5 to 20 carbon atoms and (b) a polyisocyanate with 4 to 40 carbon atoms and with 2 to 4 isocyanate groups per molecule, (B) a polyfunctional hydroxy compound having a molecular weight of 178 to 12,000 and a hydroxyl content of 0.5 to 30% by weight in an amount of 0.5 to 1.5 equivalents of hydroxy per equivalent of isocyanate of component A, and (C) a photoinitiator in an amount of 0.1 to 10% by weight of component A. The curing takes place in a first stage by radiation having a wavelength of 90 to 600 nm and in a second stage by reaction of the isocyanate groups of component A with water vapor and the hydroxyl groups of the polyfunctional hydroxy compound.

12 Claims, No Drawings

PROCESS FOR COATING A SUBSTRATE WITH A RADIATION AND MOISTURE CURABLE COATING COMPOSITION

This invention relates to a method for coating a substrate by applying to it a radiation curable coating composition based on a urethane compound and subjecting it to radiation having a wavelength of 90 to 600 nm. A method of the type indicated above is known from the U.S. Pat. No. 3,719,638, according to which an acrylic urethane compound free of isocyanate groups, which is the reaction product of a polyisocyanate, a (meth)acrylic ester having a hydroxy group and a polyfunctional hydroxy compound, is applied to a substrate and cured. It is preferred that the urethane compound should be prepared stepwise in such a way that first an adduct is prepared by reacting 2 equivalents of a polyisocyanate with 1 equivalent of a (meth)acrylic ester having a hydroxy group, and subsequently reacting the intermediate product with a polyfunctional hydroxy compound to obtain the final monomer free of isocyanate groups. More particularly, as polyfunctional hydroxy compound a styrene-allyl alcohol copolymer having a molecular weight in the range of 200 to 30,000 is used, the number of acrylate groups per molecule being determinative of the speed of radiation curing. Moreover, from British Pat. No. 1 159 551 a coating composition is known which, too, contains as binder an acrylic urethane compound free of isocyanate groups. This composition is exclusively cured by ionizing radiation in the form of a bundle of accelerated electrons.

Although radiation having a wave length of 90 to 600 nm as curing means offers the advantages of low energy consumption and rapid curing without the substrate strongly increasing in temperature, the inside of a coating composition with a hiding pigment is not cured sufficiently rapidly as a result of the pigment arresting the radiation. Furthermore, in the case of non-flush substrates such as automobile bodies and chassis it is not simple to radiate and cure every part of the coating layer, partly as a result of the distance from the radiation source(s) to the substrate not being constant. Finally, because of oxygen inhibition at the surface generally a too low scratch hardness of the coating layer is obtained and adhesion of the composition to the substrate is unfavourably influenced as a result of shrinkage.

The invention has for its object to provide a method which does not display the above-mentioned advantages. According to the invention curing is carried out in two, mainly separate, steps, primary curing being effected by radiation and further curing taking place as a result of a chemical reaction in which the isocyanate groups of the urethane compound are cross-linked by means of moisture from the ambient air (so-called moisture curing), in combination with a specific polyfunctional hydroxy compound also contained in the composition.

The method according to the invention is characterized in that a composition comprising (A) an at least one isocyanate group-containing adduct of (a) an acrylic of methacrylic hydroxy ester with 5 to 20 carbon atoms and (b) a polyisocyanate with 4 to 40 carbon atoms and with 2 to 4 isocyanate groups per molecule, (B) a polyfunctional hydroxy compound having a molecular weight of 178 to 12,000 and a hydroxyl content of 0.5 to 30% by weight in an amount of 0.5 to 1.5 equivalents of hydroxy per equivalent of isocyanate of component A, and (C) a photoinitiator in an amount of 0.1 to 10% by weight of component A, is applied to the substrate, and the coating layer is subjected to radiation, and mainly after radiation the adduct is reacted with water vapour.

Use of the method according to the invention results in rapid drying upon radiation of the surface of the composition which may or may not contain a pigment, as a result of which the coated object is little susceptible to depositing dust and can be handled and transported very shortly after being treated. As a result, a high rate of passage during manufacture and an effective use of the spraying and drying booths are achieved. The commonly used pigments can further be ground in the presence of the polyfunctional hydroxy compound(s) and dispersed therein. This offers the considerable advantage that the pigments need not be ground together with the radiation curable adduct, so that no premature curing occurs as a result of the free isocyanate groups of the adduct reacting with moisture from the pigment or by thermal instability of the radiation curable adduct as a result of the ethylenically unsaturated groups if the temperature should rise during the grinding treatment. The second curing step to be used according to the invention has the important advantage that the coating layer will finally have a hardness which is sufficient also in those places which were not or insufficiently radiated and cured in the first curing step.

The adduct to be used according to the invention is on the one hand built up from one or more acrylic or methacrylic hydroxy esters containing 5 to 20 carbon atoms and preferably 5 to 15 carbon atoms (hereinafter referred to as hydroxy(meth)acrylate). The hydroxy(meth)acrylate contains one hydroxy group. As examples of suitable hydroxy(meth)acrylates may be mentioned 2-hydroxyethylacrylate, 2-hydroxyethylmethacrylate, 3-hydroxypropylacrylate, 3-hydroxypropylmethacrylate, 4-hydroxybutylacrylate, 8-hydroxyoctylacrylate, 12-hydroxydodecanylacrylate, 2-hydroxy-3-chloropropylacrylate, 2-hydroxy-3-acryloxypropylacrylate, 2-hydroxy-3-methacryloxypropylmethacrylate, trimethylol propanediacrylate, trimethylol propanedimethacrylate, pentaerythritoltriacrylate and pentaerythritoltrimethacrylate. Also mixtures of 2 or more hydroxy(meth)acrylates may be used. It is preferred that 2-hydroxyethylacrylate, 4-hydroxybutylacrylate or pentaerythritoltriacrylate should be used.

On the other hand the adduct to be used according to the invention is built up from one or more polyisocyanates containing 4 to 40 carbon atoms and 2 to 4, and preferably 2 or 3, isocyanate groups per molecule. The polyisocyanate may be of an aliphatic, cycloaliphatic or aromatic nature and should preferably contain 15 to 40 carbon atoms. For a priming coat it is preferred that use should be made of an adduct with an aromatic polyisocyanate and for a top coat preferably an adduct with a (cyclo)aliphatic polyisocyanate should be employed. As examples of suitable (ar)aliphatic or (cyclo)aliphatic diisocyanates may be mentioned tetramethylene-1,4-diisocyanate, hexamethylene-1,6-diisocyanate, ω,ω'-dipropylether diisocyanate, thiodipropyl diisocyanate, 2,2,4-trimethylhexane-1,6-diisocyanate, 2,4,4-trimethylhexane-1,6-diisocyanate, cyclohexyl-1,4-diisocyanate, isophoron diisocyanate, the adduct of 1 molecule of 1,4-butanediol and 2 molecules of isophoron diisocyanate, the adduct of 1 molecule of 1,4-butanediol and 2 molecules of hexamethylene diisocyanate, dicyclohexylmethane-4,4'-diisocyanate, dicyclohexyldimethylmethane-4,4'-diisocyanate, xylylene diisocyanate, 1,5-dimethyl(2,4-ω-diisocyanatomethyl)benzene, 1,5-dimethyl(2,4-107 -diisocyanatoethyl)benzene, 1,3,5-trimethyl(2,4-ω-diisocyanatomethyl)benzene and 1,3,5-triethyl(2,4-ω-diisocyanatomethyl)benzene. As examples of suitable aromatic diisocyanates may be mentioned toluene diisocyanate, diphenylmethane-4,4'-diisocyanate, naphthalene diisocyanate, 3,3'-bistoluene-diisocyanate and 5,5'-dimethyldiphenylmethane-4,4'-diisocyanate. As examples of suitable triisocyanates may be mentioned the adduct of 3 molecules of hexamethylene-1,6-diisocyanate and 1 molecule of water (marketed by Bayer under the trade name Desmodur N), the adduct of 1 molecule of trimethylol propane and 3 molecules of isophoron diisocyanate and the adduct of 1 molecule of trimethylol propane and 3 molecules of toluene diisocyanate (marketed by Bayer under the trade name Desmodur L). A suitable tetraisocyanate is for example the adduct of 1 molecule of pentaerythritol and 4 molecules of hexamethylene-1,6-diisocyanate. Also mixtures of two or more of the above-envisaged polyisocyanates may be used. It is preferred that use should be made of the adduct of 3 molecules of hexamethylene-1,6-diisocyanate and 1 molecule of water, or the adduct of 1 molecule of trimethylol propane and 3 molecules of toluene diisocyanate or the adduct of 1 molecule of trimethylol propane and 3 molecules of isophoron diisocyanate.

The formation of an adduct from a polyisocyanate and a hydroxy(meth)acrylate may generally be carried out by adding the reaction components together in any arbitrarily chosen way, optionally at elevated temperature. It is preferred that the reaction should be carried out under anhydrous conditions in an atmosphere of an inert gas at temperatures in the range of 5° to 100° C., more particularly in the range of 20° to 80° C. Although generally the reaction components may be added together in any arbitrarily chosen way, it will as a rule be preferred that the hydroxy(meth)acrylate should be added to the polyisocyanate, which may be done in several stages, if desired. As a rule, the reaction will be carried out in the presence of an inert solvent, for instance: acetone, methylisobutyl ketone, toluene, xylene, or esters such as butyl acetate of ethyl glycol acetate, but the use of a solvent is not strictly necessary. Optionally the reaction between the isocyanate groups and the hydroxy groups may be carried out in the presence of a catalyst. As examples of suitable catalysts may be mentioned tertiary amines and organic tin salts or zinc salts such as dibutyl tin dilaurate, tin octoate and zinc octoate. Also mixtures of catalysts may be used.

The radiation curable composition contains one or more photoinitiators in a usual amount of 0.1 to 10% by weight, based on the adduct according to the invention. As examples of suitable initiators may be mentioned benzophenone, acetophenone, diethoxyacetophenone, chlorothioxanthone, benzoin and benzoin ethers such as benzoin methyl ether, benzoin ethyl ether and benzoin tert.butyl ether. It is preferred that diethoxyacetophenone should be used because it does not or hardly cause the composition to yellow. If desired, the composition may also contain photosensitizers. A suitable example thereof is Michler's ketone.

As the isocyanate groups of the adduct according to the invention should be cross-linked not only with the aid of moisture from the ambient air, but also by means of a polyfunctional hydroxy compound, the radiation curable composition also contains one or more of such compounds. To prevent premature curing or cross-linking, the adduct containing at least one isocyanate group and the polyfunctional hydroxy compound(s) are intermixed preferably shortly before the radiation curable compound is applied to the substrate. The polyfunctional hydroxy compounds, which contain at least 2 hydroxyl groups per molecule, may be selected from the classes of polyols usually employed for the preparation of polyurethane coating compositions, for instance the polyester polyols, polyether polyols, acrylate polyols and polycaprolactones. As examples of representative polyhydroxy compounds may be mentioned polyester polyols modified with a fatty acid and having a hydroxyl content of about 1 to 8% by weight, branched polyether polyols having a hydroxyl content of 8 to 15% by weight, alkyd resins based on phthalic acid, propylene glycol and a synthetic fatty acid and having a hydroxyl content of about 2 to 5% by weight, epoxy resins based on the diglycidyl ether of Bisphenol A having a hydroxyl content of about 4% by weight, hydroxyacrylate resins made up of e.g. styrene, an alkylmethacrylate or methacrylate and a hydroxyalkyl acrylate which have a hydroxyl content of about 3 to 10% by weight and polycaprolactone polyols, having a hydroxyl content of about 4 to 8% by weight and esterpolyols such as the reaction product of 1 mole of maleic acid and 2 moles of trimethylol propane and the reaction product of 1 mole of maleic acid with 2 moles of ethylene glycol. The molecular weight of the polyfunctional hydroxy compounds is preferably in the range of 300 to 8000. The hydroxyl content is preferably in the range of 1 to 22% by weight. The polyfunctional hydroxy compound is present in the coating composition in such an amount that per 1 equivalent of isocyanate of the adduct in general 0.5 to 1.5 and preferably 0.9 to 1.1 equivalents of hydroxy are present in the composition.

The coating composition may, if desired, contain still other additives, for instance: pigment dispersing agents, levelling agents, fillers, pigments, colouring agents, polymerization inhibitors, solvents, catalysts for the curing of the free isocyanate groups of the adduct with the aid of water vapour and the polyfunctional hydroxy compound(s), for instance: organic tin salts or zinc salts and tertiary amines such as triethylene diamine, trimethylamine and N-methylmorpholine. The coating composition may further contain monomers such as methyl methacrylate, ethyl methacrylate, butyl acrylate, 2-ethylhexyl acrylate, ethylene glycol diacrylate, neopentyl glycol diacrylate, glycerol triacrylate and trimethylol propane triacrylate.

Application of the coating composition to a particular substrate may be carried out in any known manner for instance by rolling, brushing, sprinkling, casting, dipping or by electrostatic spraying, and preferably by spraying. The coating composition may with advantage be applied to a substrate of a synthetic material such as polyurethane elastomers and to metal substrates, for instance as automobile paint or automobile repair paint, as coil coating or can coating and as shop primer to sandblasted stell. The composition may further be applied as furniture lacquer to, for instance, chip board, ply wood, board and veneered core board.

According to the invention hardening of the radiation curable coating composition is effected in 2 stages. In the first stage the composition, after it has been applied to a particular substrate, is subjected to radiation having a wave length of 90 to 600 nm (UV-light and blue light). As radiation source there may serve, for instance, a mercury or xenon lamp, which works at high, medium or low pressure. The composition need be radiated only for a few seconds up to a few minutes in order to ensure such drying that the coating layer is tack-free and of such hardness that it can be handled.

In the second curing stage the coating is given its final hardness as a result of the progressing reaction of the isocyanate groups of the adduct with the water vapour and the hydroxyl groups of the polyfunctional hydroxy compound. The second curing stage may take place at a temperature in the range of, say, 0° to 160° C., over a period ranging from 5 minutes to a few days. It is preferred that this curing should take place over a period of several days at room temperature. It is found that after the coating has been cured for seven days at about 10° C., it has about the same hardness as after a curing treatment of 10 minutes at 120° C. Carrying out the second curing stage at room temperature offers the considerable advantage that it does not require any energy nor any capital expenditure.

The invention will be further described in the following examples, which are not to be considered to limit the scope of the present invention. In them the following polyfunctional hydroxy compounds are used:

Polyol A: a fatty acid modified polyester polyol having a hydroxyl content of about 4% by weight and an acid number lower than 20 (available under the trade name Desmophen 1300 of Bayer). The polyol is employed as a 75% by weight solution in xylene.

Polyol B: a branched polyether polyol having a hydroxyl content of about 11.5% by weight and an acid number lower than 0.5 (available under the trade name Desmophen 550 U of Bayer).

Polyol C: an alkyd resin modified with synthetic fatty acid and obtained by reaction of 47 parts by weight of phthalic acid, 37 parts by weight of propylene glycol and 26 parts by weight of fatty acid, which alkyd resin has a hydroxyl content of about 3.0% by weight.

Polyol D: an epoxy resin based on the diglycidyl ether of Bisphenol A and having a hydroxyl content of about 3.8% by weight (marketed by Shell under the trade name Epikote 1001). The polyol is used as a 75% by weight solution in xylene.

Polyol E: a hydroxyacrylate resin made up of 35% by weight of styrene, 30% by weight of methylmethacrylate and 35% by weight of hydroxypropyl acrylate, and having a hydroxyl content of 5.0% by weight and a molecular weight of 3000. The polyol is used as a 55% by weight solution in xylene.

Polyol F: a polycaprolactone polyol having a hydroxyl content of 6.3% by weight and a molecular weight of 500.

As radiation curable polyurethane compounds are used:

Adduct P: the adduct obtained by reaction of 1 mole of the adduct of 1 mole of trimethylol propane and 3 moles of toluene diisocyanate with 3 moles of hydroxybutyl acrylate.

Adduct Q: the adduct obtained by reaction of 1 mole of the adduct of 1 mole of trimethylol propane and 3 moles of toluene diisocyanate with 1½ moles of pentaerythritol triacrylate.

Adduct R: the adduct obtained by reaction of 1 mole of the adduct of 3 moles of hexamethylene diisocyanate and 1 mole of water with 1½ moles of hydroxybutyl acrylate.

Adduct S: the adduct obtained by reaction of 1 mole of the adduct of 3 moles of hexamethylene diisocyanate and 1 mole of water with 1½ moles of pentaerythritol triacrylate.

The adduct P-S are applied as 70% by weight solutions in butyl acetate.

In the preparation of each coating composition according to the invention 100 parts by weight of the polyfunctional hydroxy compound (polyols A and C-E as solution) were mixed with the amount by weight of solution of the respective adduct P-S mentioned in Table 1.

Table 1

| Polyol | Adduct | | | |
|---|---|---|---|---|
| | P | Q | R | S |
| A | 230 | 319 | 170 | 260 |
| B | 660 | 916 | 499 | 747 |
| C | 172 | 239 | 128 | 195 |
| D | 218 | 303 | 162 | 247 |
| E | 287 | 398 | 213 | 325 |
| F | 362 | 502 | 268 | 409 |

For the curing treatment in the first phase use was made in all examples of a UV lamp of the HOK type (Philips). The coatings obtained were tested for tackiness and for resistance to rotational pressure, i.e. the resistance to damage of the coating upon rotation of a punch applied to the coating at a pressure of 9.8 N/cm$^2$. The punch, which had a pressure surface area of 1 cm$^2$, was turned for 1 second through an angle of $\frac{1}{2}\pi$ rad. The values determined are in the range of 1 to 10. In the test for tackiness a value 1 stands for the surface remaining dust free and a value 10 for a 100%-tacky surface. In the determination of the resistance to rotational pressure the value 1 denotes that no damage has occurred, whereas a value 10 indicates that the punch has penetrated into the paint to such a degree that the coating of the area subjected to the test has entirely been removed. Moreover, the hardness of the coating is tested manually.

EXAMPLES 1-24

In all the examples the adducts P, Q, R and S were each mixed with one of the afore-mentioned polyhydroxy compounds A-F in the weight ratios mentioned in Table 1. To the resulting mixtures there was in each case added chlorothioxanthone as photoinitiator in an amount of 4% by weight, based on the adduct. The compositions obtained were applied to steel panels to a coating thickness of 35 μm (in the cured state), after which the panels were immediately passed under a UV lamp at a speed of 5 m/min. The distance between the lamp and the panels was 40 cm. Immediately after radiation the tackiness and the resistance to rotational pressure were determined and the duration between the exposure to radiation and the moment the coatings were tack-free or had a resistance to rotational pressure of 1. The resulting coatings were well cured in all cases if they had been kept at room temperature for 5 days. The values determined are listed in the following Table 2.

Table 2

| | | Immediately after radiation | | Drying time in min. after radiation until: | |
|---|---|---|---|---|---|
| Example | Polyol | Tackiness | Resist. to rot. press. | Tack-free | Value 1 for resist. to rot. pressure |
| | | Adduct P | | | |

Table 2-continued

| | | Immediately after radiation | | Drying time in min. after radiation until: | |
|---|---|---|---|---|---|
| Example | Polyol | Tackiness | Resist. to rot. press. | Tack-free | Value 1 for resist. to rot. pressure |
| 1 | A | 8 | 8 | 8 | 29 |
| 2 | B | 7 | 7 | 8 | 25 |
| 3 | C | 8 | 8 | 4 | 12 |
| 4 | D | 8 | 9 | 8 | 32 |
| 5 | E | 8 | 8 | 9 | 16 |
| 6 | F | 3 | 2 | 1 | 1 |
| Adduct Q | | | | | |
| 7 | A | 9 | 9 | 3 | 4 |
| 8 | B | 8 | 8 | 5 | 5 |
| 9 | C | 9 | 9 | 3 | 4 |
| 10 | D | 7 | 7 | 1 | 2 |
| 11 | E | 6 | 9 | 9 | 13 |
| 12 | F | 1 | 2 | 1 | 1 |
| Adduct R | | | | | |
| 13 | A | 9 | 7 | 15 | 39 |
| 14 | B | 9 | 7 | 15 | 35 |
| 15 | C | 9 | 9 | 12 | 30 |
| 16 | D | 9 | 9 | 8 | 24 |
| 17 | E | 8 | 9 | 20 | 20 |
| 18 | F | 2 | 1 | 1 | 0.5 |
| Adduct S | | | | | |
| 19 | A | 8 | 9 | 6 | 9 |
| 20 | B | 5 | 7 | 7 | 12 |
| 21 | C | 9 | 9 | 4 | 8 |
| 22 | D | 3 | 4 | 2 | 2 |
| 23 | E | 6 | 9 | 5 | 5 |
| 24 | F | 1 | 1 | 0 | 0 |

EXAMPLES 25–35

The adducts mentioned in Table 3 were mixed with the afore-mentioned polyhydroxy compounds and subsequently pigmented to a pigment volume concentration of 30% using a mixture of 6 parts by weight of talc and 1 part by weight of iron oxide red. As photoinitiator there was added chlorothioxanthone in an amount of 2.5% by weight, based on the adduct. Moreover, there was added as sensitizer triethanolamine in an amount of 2% by weight, based on the adduct. As solvent there was added butyl acetate in order to bring the composition to spray viscosity (20 seconds efflux time, DIN-cup 4). The resulting compositions were applied to steel panels to a layer thickness of 16–18 μm (in the cured state). Two minutes later the panels were passed under a UV lamp at a speed of 5 m/min. The distance between the lamp and the panels was 40 cm. The duration was determined between radiation and the moment the coatings were tack-free or had a resistance to rotational pressure of 1. Except the coating of Example 29 all coatings obtained were well cured after they had been kept at room temperature for 14 days. The values obtained are mentioned in Table 3.

Table 3

| | | | Drying time in min. after radiation until: | |
|---|---|---|---|---|
| Example | Polyol | Adduct | Tack-free | Value 1 for resist. to rotational pressure |
| 25 | A | P | 3 | 16 |
| 26 | A | Q | 2.5 | 9 |
| 27 | A | R | 8 | 23 |
| 28 | A | S | 1 | 6 |
| 29 | B | Q | 2 | 12 |
| 30 | C | Q | 0.75 | 3.5 |
| 31 | C | S | 0.50 | 1.75 |
| 32 | D | P | 2.5 | 10 |

Table 3-continued

| | | | Drying time in min. after radiation until: | |
|---|---|---|---|---|
| Example | Polyol | Adduct | Tack-free | Value 1 for resist. to rotational pressure |
| 33 | D | Q | 2.5 | 8.5 |
| 34 | D | R | 2 | 18 |
| 35 | D | S | 0.25 | 1.5 |

EXAMPLES 36–39

The Examples 30–33 were repeated in such a way that the compositions were applied with a spray gun and after the panels had been left only for 15 seconds they were passed under a UV lamp. It was found that immediately after radiation the coatings were tack-free and then it was only 10, 15, 13 and 20 seconds, respectively, that the coatings had a value 1 for resistance to rotational pressure. All coatings were well cured.

EXAMPLES 40–47

The compositions envisaged in the Examples 30, 31, 33 and 35 were applied to steel panels to a layer thickness of 16–18 μm (in the cured state) with the aid of spray gun. After the panels had been left for 15 seconds or 1 minute, they were passed under a UV lamp at a rate of 10 m/min. The distance between the lamp and the panels was 40 cm. Immediately after radiation the coatings were tack-free. The durations between radiation and the moment the coatings had reached a value 1 for resistance to rotational pressure are mentioned in Table 4. All coatings were well cured after they had been kept at room temperature for 14 days.

Table 4

| Example | Polyol | Adduct | Waiting time | Drying time in sec. after radiation until value 1 for resistance to rotational pressure |
|---|---|---|---|---|
| 40 | C | Q | 15 sec. | 30 |
| 41 | C | Q | 1 min. | 0 |
| 42 | C | S | 15 sec. | 15 |
| 43 | C | S | 1 min. | 0 |
| 44 | D | Q | 15 sec. | 25 |
| 45 | D | Q | 1 min. | 0 |
| 46 | D | S | 15 sec. | 30 |
| 47 | D | S | 1 min. | 15 |

What is claimed is:

1. A process for coating a substrate by applying to it a radiation curable coating composition based on a urethane compound and subjecting it to radiation have a wavelength of 90 to 600 nm, characterized in that a composition comprising (A) an at least one isocyanate group-containing adduct of (a) an acrylic or methacrylic hydroxy ester with 5 to 20 carbon atoms and (b) a polyisocyanate with 4 to 40 carbon atoms and with 2 to 4 isocyanate groups per molecule, (B) a polyfunctional hydroxy compound having a molecular weight of 178 to 12,000 and a hydroxyl content of 0.5 to 30% by weight in an amount of 0.5 to 1.5 equivalents of hydroxy per equivalent of isocyanate of component A, and (C) a photoinitiator in an amount of 0.1 to 10% by weight of component A, is applied to the substrate, and the coating layer is subjected to radiation and mainly after radiation the adduct is reached with water vapour.

2. A process according to claim 1, characterized in that the acrylic or methacrylic hydroxy ester contains 5 to 15 carbon atoms.

3. A process according to claim 1 or 2, characterized in that 2-hydroxyethylacrylate, 4-hydroxybutylacrylate or pentaerythritoltriacrylate is used as acrylic or methacrylic hydroxy ester.

4. A process according to claim 1, characterized in that the polyisocyanate contains 15 to 40 carbon atoms.

5. A process according to claim 1, characterized in that the polyisocyanate contains 2 or 3 isocyanate groups per molecule.

6. A process according to claim 1, characterized in that as polyisocyanate there is used the adduct of 3 molecules of hexamethylene-1,6-diisocyanate and 1 molecule of water, the adduct of 1 molecule of trimethylol propane and 3 molecules of toluene diisocyanate or the adduct of 1 molecule of trimethylol propane and 3 molecules of isophoron diisocyanate.

7. A process according to claim 1, characterized in that in the composition there is present a polyfunctional hydroxy compound in an amount of 0.9 to 1.1 equivalents of hydroxy per equivalent of isocyanate of component A.

8. A process according to claim 1, characterized in that the polyfunctional hydroxy compound contained in the composition is a polyester polyol, a polyether polyol, an acrylate polyol or a polycaprolactone.

9. A process according to claim 1, characterized in that the composition contains a polyfunctional hydroxy compound having a molecular weight in the range of 300 to 8000.

10. A process according to claim 1, characterized in that the composition contains a polyfunctional hydroxy compound having a hydroxyl content of 1 to 22% by weight.

11. A substrate coated wit a cured coating composition obtained by the method according to any one of claims 1 and 4–10.

12. A process for coating a substrate with a composition containing a cross-linked urethane which comprises coating the substrate with a cross-linkable urethane composition comprising
  A. an —NCO terminated ethylenically unsaturated adduct of an acrylic or methacrylic hydroxy ester having 5 to 20 carbon atoms and an organic polyisocyanate having 4 to 40 carbon atoms and from 2 to 4 isocyanate groups per molecule;
  B. an organic polyhydroxy compound having a molecular weight of 178 to 12,000 and a hydroxyl content of 0.5 to 30% by weight, and
  C. a photoinitiator said mixture containing A and B in a ratio which provides 0.5 to 1.5 equivalents of hydroxy per equivalent of —NCO and containing from 0.1 to 10% by weight of C based on the weight of A,
  polymerizing the adduct through its unsaturation with irradiation and subsequently reacting isocyanate groups of the resulting polymer with hydroxy groups of B.

* * * * *

UNITED STATES PATENT AND TRADEMARK OFFICE
CERTIFICATE OF CORRECTION

PATENT NO. : 4,173,682

DATED : November 6, 1979

INVENTOR(S) : Noomen et al.

It is certified that error appears in the above-identified patent and that said Letters Patent are hereby corrected as shown below:

In the Abstract, line 2, change "curble" to ---curable---.

Claim 1, last line, "reached" should be changed to ---reacted---.

Claim 11, line 1, change "wit" to -- with --.

Signed and Sealed this

Twenty-seventh Day of May 1980

[SEAL]

Attest:

SIDNEY A. DIAMOND

Attesting Officer    Commissioner of Patents and Trademarks